(12) United States Patent
Rosen

(10) Patent No.: US 8,184,797 B1
(45) Date of Patent: May 22, 2012

(54) SYSTEM AND METHOD FOR IMPROVED DIRECTORY ASSISTANCE SEARCHES

(76) Inventor: Richard Rosen, Los Angeles, CA (US)

( * ) Notice: Subject to any disclaimer, the term of this patent is extended or adjusted under 35 U.S.C. 154(b) by 1041 days.

(21) Appl. No.: 12/152,848

(22) Filed: May 16, 2008

Related U.S. Application Data

(60) Provisional application No. 60/930,857, filed on May 18, 2007.

(51) Int. Cl.
H04M 3/42 (2006.01)
H04M 3/00 (2006.01)
(52) U.S. Cl. ............................ 379/218.01; 379/265.02
(58) Field of Classification Search ............ 379/218.01, 379/265.01, 265.02, 265.11–265.13, 265.06; 705/1, 26, 37
See application file for complete search history.

(56) References Cited

U.S. PATENT DOCUMENTS

| | | |
|---|---|---|
| 6,519,570 B1 | 2/2003 | Faber et al. |
| 6,636,590 B1 | 10/2003 | Jacob et al. |
| 6,704,403 B2 | 3/2004 | Lurie et al. |
| 6,865,540 B1 | 3/2005 | Faber et al. |
| 7,120,235 B2 | 10/2006 | Altberg et al. |
| 7,212,615 B2 | 5/2007 | Wolmuth |
| 7,224,781 B2 | 5/2007 | Jacob et al. |
| 7,302,429 B1 * | 11/2007 | Wanker ................ 1/1 |
| 7,668,832 B2 | 2/2010 | Yeh et al. |
| 2004/0234049 A1 | 11/2004 | Melideo |
| 2004/0234064 A1 | 11/2004 | Melideo |
| 2004/0236441 A1 | 11/2004 | Melideo |
| 2004/0258048 A1 | 12/2004 | Melideo |
| 2004/0260413 A1 | 12/2004 | Melideo |
| 2005/0015307 A1 * | 1/2005 | Simpson et al. ............. 705/26 |
| 2006/0026089 A1 * | 2/2006 | Replanski et al. ............ 705/37 |
| 2007/0121844 A1 * | 5/2007 | Altberg et al. ......... 379/114.13 |

(Continued)

OTHER PUBLICATIONS

Getting Started with SkypeFind, Oct. 30, 2007, pp. Four Pages, Publisher: http://www.skype.com/help/guides/skypefind.html, Published in: US.

(Continued)

*Primary Examiner* — Ahmad Matar
*Assistant Examiner* — Sonia Gay
(74) *Attorney, Agent, or Firm* — Suiter Swantz pc llo

(57) ABSTRACT

A system and method for improved directory assistance searches involving feedback from previous calls made to telephone numbers in a vendor database, in order to improve the quality of customer service and satisfaction by the vendors associated with the telephone numbers, and to find the vendors associated with the telephone numbers that have provided quality customer service in the past. The system and method automatically rates a telephone number according to a plurality of parameters. The rating produces a relevancy score relating to the quality of customer service and satisfaction (QOCS) associated with calling the vendor telephone number. Vendors associated with telephone numbers that score high on the QOCS scale are given priority to incoming calls from consumers seeking directory assistance in the vendors' field. Feedback between a calling party customer and a called party vendor is possible, in real time, before, prior to, or after the actual conversation between customer and vendor, and multiple vendors may be called and screened automatically by the system in response to specific calling party needs. In one embodiment of the system, dirty numbers (numbers reassigned to a second party from a previous party) are screened. In another embodiment, vendors who consistently score high on the QOCS scale may be targeted for solicitation. In yet another embodiment, a method is disclosed for assessing an advertising fee based on referrals received by vendors using the present invention. In another embodiment, a web interface version of the invention is disclosed.

10 Claims, 7 Drawing Sheets

U.S. PATENT DOCUMENTS

2007/0192130 A1* 8/2007 Sandhu .............................. 705/1

OTHER PUBLICATIONS

Godbole, Namrata, et al., "Large-Scale Sentiment Analysis for News and Blogs (System Demonstration)"; Mar. 26, 2007, 2 pages, ICWSM 2007, Boulder, Colorado.

Singhal, Amit, "Being bad to your customers is bad for business", Dec. 1, 2010, Google blog; 4 pages, URL: http://googleblog.blogspot.com/2010/12/being-bad-to-your-customers-is-bad-for.html, 4 pages.

Claburn, Thomas, "Google Says Bad Publicity Now Hurts Search Ranking", Dec. 1, 2010, Information Week, URL: http://www.informationweek.com/story/showArticle.jhtml?articleID=228500088, 2 pages.

* cited by examiner

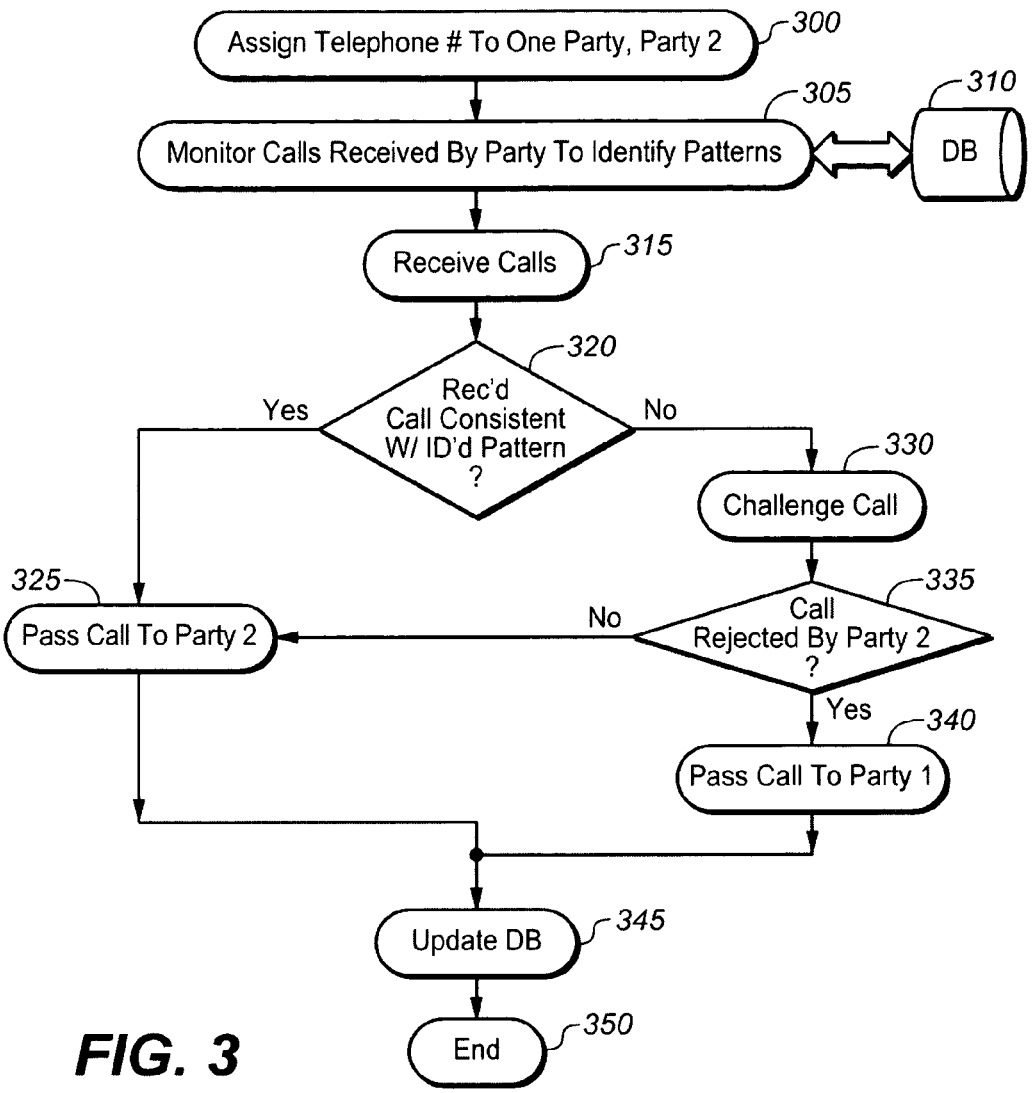
FIG. 3
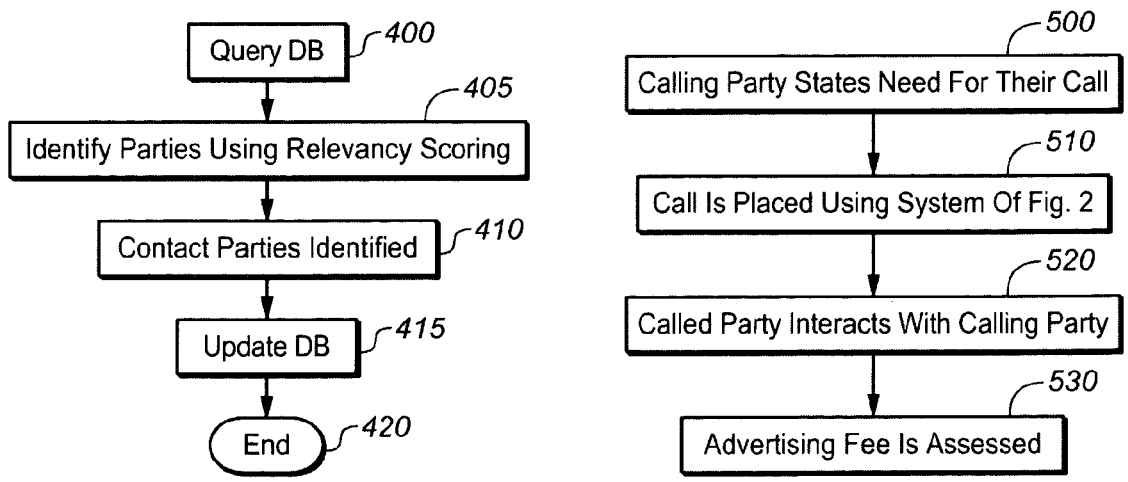
FIG. 4
FIG. 5

(xxx) xxx-1212 (not you?) | Personalize | Advanced Options

What (Category) ⌐610  Where (City) ⌐620  ⌐630
[Plumbing]        [Los Angeles, CA]      [Search]
                  ☑ Default Categories >> Professional Services >> Plumbing, Heating & Air >> Plumbing 670
Assured Best Plumbing Contractors - call ☎ } 650
5457 Crenshaw Blvd, Los Angeles, CA

Input your phone number
[_____] [Call]
☐ Save this number  ⌐660
⌐680 close

Budget Plumbing - call ☎
794 Merchant St, Los Angeles, CA

Clean Edge Plumbing Incorporated - call ☎
720 E 2nd St, Los Angeles, CA

Ritz Plumbing & Heating Company - call ☎
8500 Beverly Blvd # 695, Los Angeles, CA      } 640

Love My Home Electric & Plumbing - call ☎
6014 State St, Los Angeles, CA

Assured Best Plumbing Contractors - call ☎
5457 Crenshaw Blvd, Los Angeles, CA

Budget Plumbing - call ☎
794 Merchant St, Los Angeles, CA

Clean Edge Plumbing Incorporated - call ☎
720 E 2nd St, Los Angeles, CA

Ritz Plumbing & Heating Company - call ☎
8500 Beverly Blvd # 695, Los Angeles, CA

Love My Home Electric & Plumbing - call ☎
6014 State St, Los Angeles, CA

Terms | About Us | Vendors

FIG. 6

SYSTEM AND METHOD FOR IMPROVED DIRECTORY ASSISTANCE SEARCHES

CROSS-REFERENCE TO RELATED APPLICATIONS

This application claims priority under 35 U.S.C. §119(e) to commonly assigned, provisional U.S. Patent Application Ser. No. 60/930,857, entitled "SYSTEM AND METHOD FOR IMPROVED DIRECTORY ASSISTANCE", listing as inventors Richard Rosen, filed May 18, 2007, incorporated by reference herein.

BACKGROUND OF THE INVENTION

1. Field of Invention

The present invention relates generally to the field of automated directory assistance.

2. Description of Related Art

The present invention relates generally to automated directory assistance.

Directory assistance ranges in the prior art from interfacing with a human operator who responds with telephone numbers associated with known parties, to automated methods such as Google Voice Local Search (Goog411), where a party may call an 800 number, request the specific telephone number of a particular business party, or a general category (e.g. "Greek restaurants in Los Angeles"), which will be recognized by automatic voice recognition means and a candidate vendor or number of candidates will be presented to the user for telephonic connection.

Call detail records can record for any telephone call the number of the caller, day, date, duration, disposition (e.g. busy/not busy), number of rings, connections and the like, by which companies can ascertain how often a particular telephone is called and other rudimentary data from call detail record data.

A directory, as used in computing and telephony, refers to a repository or database of information which is heavily optimized for reading. Commonly, a directory supports search and browsing in addition to simple lookups. Directories may be printed (e.g. print telephone directory) or electronic form (e.g. the internet website located at www.yellowpages.com.)

An expert system is an Artificial Intelligence (AI) application that uses a knowledge base of human expertise for problem solving. Its success is based on the quality of the data and rules obtained from the human expert. An expert system derives answers by running the knowledge base through an inference engine, which is software that interacts with the user and processes the results from the rules and data in the knowledge base. An expert system may be populated with information by the process of knowledge acquisition, which is the process of acquiring knowledge from a human expert for the expert system, and can be organized into IF-THEN rules, using a knowledge base, or some other form of knowledge representation. A knowledge base is a database of rules about a subject used in AI applications. A knowledge based expert system is an AI application that uses a database of knowledge about a subject.

Examples of expert systems include systems used in medical diagnosis, equipment repair, investment analysis, financial, estate and insurance planning, vehicle routing, contract bidding, production control and training.

Phone systems are communication channels connecting, either wirelessly or with wires, end users to one another, either in real-time voice or data interactions (i.e., transactions between end users occurring immediately) or batch-time processing (e.g. voice mail). A variety of hardware and software devices can be connected to the communication channels, including but not limited to land-line phones, wireless phones, PDAs (personal digital assistants), computers connected to a packet network, including the internet (e.g. Skype) and the like.

Quality of Service (QOS) is a defined level of performance in a data communications system, typically as it relates to such technical factors as bandwidth and latency of a communications channel. However, for purposes more relevant to the present invention, Quality of Customer Service/Satisfaction (QOCS) can be generally defined as any arbitrary and/or predetermined measure of a business that uses telephony and interacts with the public, that is determined according to the ability of the business to provide consumers with desirable service, however desirable service may be subjectively and arbitrarily defined, and as defined further herein by a weighed relevancy methodology producing a relevancy score.

Telephone networks are dynamic networks that constantly evolve and change, not least because they are connected to human beings, networks, servers and devices that are constantly evolving and changing. The quality of service associated with businesses also changes, as businesses evolve over time. But in the prior art of directory assistance, there is presently no way of dynamically, over time, automatically acquiring, storing, managing, and disseminating information about, and measuring the Quality of Customer Service/Satisfaction (QOCS) in such a way as to give a prospective customer using directory assistance a measure of worth or the rating of a business being sought, even on a real-time basis. The present invention addresses this concern.

SUMMARY OF THE INVENTION

Accordingly, an aspect of the present invention is to provide a software-based system and method of automatically measuring Quality of Customer Service/Satisfaction (QOCS) in a telephone system delivering voice or data services, where a user requests search results or directory assistance searches for a business listing.

Another aspect of the present invention is employing a system to dynamically measure and index QOCS as well as provide a calling party user with a relevancy score relating to QOCS for a called party prospective business.

A further aspect of the present invention is an expert system that elicits information from a caller as to what business goods and services the caller desires.

A further aspect of the present invention involves a system and method for providing relevance-driven local searches of business via directory assistance searches, where QOCS relevancy scores, which act as "merchant reviews", will be captured at the point of a call being made by a prospective customer, with the information captured by such a system available for immediate use, rather than relying on slower forms of information use such as exchange by word of mouth, customer reviews, reviews in traditional media, ratings by consumer oriented agencies, and the like. Thus the present invention uses the actual connection data behind a call to rate the merchant.

Another aspect of the present invention concerns the scoring methodology behind QOCS relevancy scores, to determine the QOCS of businesses to a caller seeking business listing directory assistance searches based on a variety of factors, including but not limited to data comprising (as defined further herein): disconnected numbers, busy signals, No Answer or Not Answered signals, answering machine/voicemail/IVR reached, average call length, consumer feedback, average historic relevancy score, (AHRS)/differential historic relevancy score (DHRS), spam, vendor placement, advertisement or lead fees, timeliness/price/quality, financial and business data, and miscellaneous data, as well as real-time answers from vendors to caller questions.

A further of the present invention is the ability of a caller to make multiple inquires to called parties, making searches for prospective business in parallel, with feedback to and from the calling party and the called party. Yet another aspect is the ability of a calling party to search for another called party, within the first call to the first called party, in a parallel search, and for called parties to bid on preferences set by the calling party.

Yet another aspect of the present invention is a method for a calling party to rate their experience with the called party.

A further aspect of the present invention involves the blocking of telemarketing spam or wrong numbers.

Still another aspect of the present invention is the ability to clean numbers that have been reassigned from one party to another, so-called "dirty numbers", so that the dirty number may successfully be used by the second party without receiving calls directed to the first party.

Another aspect of the present invention is the ability for a called party to respond to feedback from a calling party, and for a called party to be provided with a menu of options that may be sent as outbound messages to the called party.

Still another aspect of the invention is assigning one or more local phone numbers to categories of advertisers to receive telephone calls from calling parties seeking businesses in specific categories and in specific geographies.

A further aspect of the present invention is the ability to target called or calling parties for solicitation by vendors of goods and services, in response to QOCS relevancy scores.

Another aspect of the present invention is the ability to charge an advertising fee based on use of the invention.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

FIG. 3 is a flowchart according to another embodiment of the present invention for screening calls that may involve "dirty numbers", i.e., numbers previously assigned to another party.

FIG. 4 is a flowchart for a method according to the present invention for targeting called or calling parties for solicitation, in response to QOCS relevancy scores.

FIG. 5 is a flowchart for a method of using the present invention that involves charging an advertising fee to a called party who accepts a call completed through the present invention.

FIG. 6 is a web interface for practicing the present invention using the internet.

Figure 1:
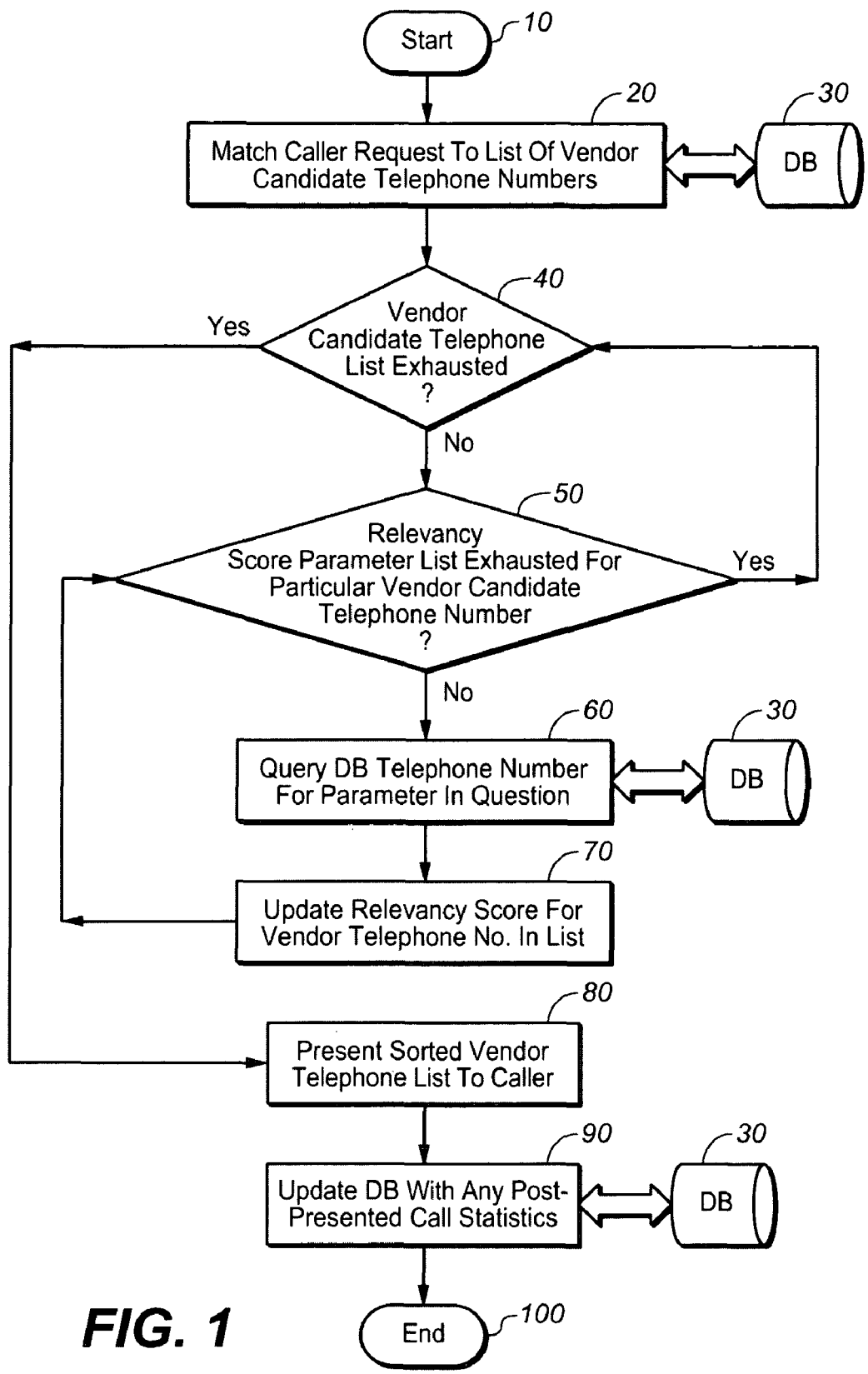
FIG. 1 is a flowchart showing how a caller seeking directory assistance searches for a prospective business is provided with a relevant telephone number according to a system that measures Quality of Customer Service/Satisfaction (QOCS).

It should be understood that one skilled in the art may, using the teachings of the present invention, vary embodiments shown in the drawings without departing from the spirit of the invention herein. In the figures, elements with like numbered reference numbers in different figures indicate the presence of previously defined identical elements.

DETAILED DESCRIPTION OF THE INVENTION

The method and apparatus of the present invention may be software or hardwire programmed (e.g., an ASIC) to perform the functions outlined herein, the hardware running firmware, or hardware running software, with the software existing in memory. The software may be written in any computer language (such as C, C++, Perl, Java or the like), and the further, and/or in the alternative, the software may be run by a computer system having an operating system. The computer system typically has one or more processors, primary and secondary memory cooperating with the processor(s), which executes instructions stored in the memory, I/O means such as monitor, mouse and keyboard, and any necessary specialized hardware or firmware. Depending on the language used to construct and implement the software, the source code, object code and/or executables of the software may have any number of classes, functions, objects, variables, templates, lines of code, portions of code and constructs (collectively and generally, "a process step", "process", "method", "methodology", "procedure", "software portion", "step", "block", "functional module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process step of the present invention, intermediate values, variables and data may be stored for later use by the program. In addition, the binary executable or source code data comprising the software of the present invention may reside on computer readable storage medium (e.g., a magnetic disk, which may be portable); memory (e.g., flash RAM); DVD or CD-ROM.

Some portions of the detailed descriptions are presented in terms of processes, procedures, logic blocks, functional blocks, and other symbolic representations of operations on data bits, data streams, or waveforms within a computer, processor, controller, and/or memory. A process, procedure, logic block, functional blocks, operation, and the like, described herein, is generally considered to include physical manipulations of physical quantities, that may take the form of electrical, magnetic, optical, or any other signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

The present invention relates generally to the field of local search. Local search ranges in the prior art from interfacing with printed directories or listings of local businesses, yellow pages directories, automated directory assistance services, live-person directory assistance services; internet web sites, mobile device browsers with access to the internet, internet yellow pages, electronic directories or other software applications in order to search for and locate telephone numbers associated with known parties. In the present invention, parties may request, inter alia, the specific telephone number of a particular business party, or a general category (e.g. "Greek restaurants in Los Angeles"); further, in the present invention business parties may be listed by a variety of factors including location of the business, specialty of business (e.g. "restaurant with catering services in Los Angeles"); parties may request specific brands sold by or serviced by the business (e.g. "Ford car dealer in Los Angeles"), business reviews, hours of operation, coupons or discounts offered, business affiliations, certifications or licensing, locations serviced by the business, number of locations of the business, methods of payment or other factors. Parties may be searched based on the content of the party's internet website, as explained further below. Parties may be listed or ranked in a directory of like business parties, for example, an advertising campaign may instruct consumers to call "800-LA-PLUMR" for the category of quality plumbers that operate in the Los Angeles region. This ranking may be alphabetical, location-based, based on specialty of the business, reviews of the business or other factors. Parties may also pay advertising or listing fees to be listed higher in the directory results. The listing fees may be based on distribution of the directory measured in circulation (number of persons receiving and using the directory). The listing fee may be based on usage and measured in the number of searches, queries, listed results, unique users, and unique telephone calls to the business party or other measures of usage of the directory or measures of communication between the searching party and the business party. The listing fee may be based on specific requests for information including requests for a business party's phone number, physical address, and/or email address. The listing fee may be based on email communication, text messages, fax messages, voice messages, and other communication sent to the business party. The communication may be a free form message communicated to the business party or a specific request for information sent to the business party whereas the searching party completes a form or questionnaire for the business party. While the above is a general outline of local search capabilities of the present invention, the present invention is not limited to just these forms of local search and the scope of the invention is not thus limited.

Turning attention to FIG. 1, there is shown a flowchart showing how a caller seeking search results for a prospective business is provided with a relevant telephone number relating to one or more such prospective businesses, the called party, according to a relevancy scored system that measures Quality of Customer Service/Satisfaction (QOCS). QOCS is measured by a methodology that computes a relevancy score comprised of a plurality of parameters. Search results (or directory assistance searches) can be seen as comprising a local search, but not just a local search involving directory assistance from a POTS (Plain Old Telephone System) but a national search (across a wide geographical area, such as an entire country), a web-based search, as well as a mobile phone search (using SMS or a mobile web browser for inputting the search request and obtaining information) for assistance in finding information. Search results generally comprise data, and voice data is considered data on a telephonic network. Though in general search results are requested by a human being, in principal, and covered by the present invention, a search result could be requested by a robot or other automated means of conveying information, including software.

QOCS is generally defined herein as any arbitrary and/or predetermined measure of a business that uses telephony (which, as described herein, includes the Internet and any system that moves data) and interacts with the public, that is determined according to the ability of the business to provide consumers with desirable service, however desirable service may be subjectively and arbitrarily defined, and as defined further herein by a weighed relevancy methodology producing a relevancy score. Typically desirable service is service that is prompt, timely, competitively priced, recommended, and the like.

The flowchart of FIG. 1 is executed by a software program running on hardware, having access to a database, which is operatively connected to the software, either as part of the software or separate from the software, and the database may be split into a plurality of separate databases that may or may not be connected with one another. The software may be written in a procedural and/or object-oriented language. Though the flow of the present invention is shown in the figures herein, other steps not shown, as understood by one of ordinary skill in the art from the teachings herein, may also be present. In addition, if the program was written in an object-oriented language, rather than a procedural language, there might be numerous objects that are instantiated and executed dynamically, at run time, or that might become activated upon the expiration of a count-down timer or the like, as is known per se in OOP (Object Oriented Programming). The flowchart for such an OOP version of the present invention could be expressed as a UML (Unified Modeling Language) diagram rather than the flowchart as shown in FIG. 1. However, this recasting of the description of the present invention would in no way alter its underlying nature.

The program of the present invention interacts with a database, as explained further herein, which is typically a relational database but can be any database or any store of data, including but not limited to a hierarchical or object database or a spreadsheet or a non-database flat file accessed for the information therein. The particular programming language, programming paradigm or database used to construct the present invention is not limited to a particular language, programming style or database.

The present invention may employ a rules-based expert system (e.g. "If-Then" rules) to determine information from the user, as is known per se. Further, the present invention may use a knowledge-based expert system to derive answers to questions from a user of the system, and the expert system can derives answers by running a knowledge base through an inference engine, which is software that interacts with the user and processes the results from the rules and data in the knowledge base. In addition, the expert system may be a hybrid expert system that combines elements of both rules-based and knowledge-based expert systems. In addition, the present invention may query a database using a query language or database language such as SQL (Structured Query Language), or any of its derivatives, to access information in the database.

Turning attention to FIG. 1, the program of the present invention starts in step 10, labeled "Start". The program starts when a caller, typically a consumer (or vendee) of business goods and services provided by the called party (e.g. the business vendor), seeks directory assistance searches, e.g. by calling 800-FAST-411. The directory assistance search provided by the present invention may be accessed from any communications device, including a traditional plain old telephone system (POTS) using a landline telephone handset, from a handheld wireless mobile phone (and/or cell phone), from a PDA, from a web-based internet browser (as part of a PC, as part of a cell phone or as part of a PDA, e.g. a BlackBerry), or any other kind of system for communicating, with the understanding that when referring to a "telephone call" or "incoming call" herein the corresponding equivalent information transmitted via computer binary data would be substituted, e.g., by a device such as a web-based internet browser and the like, with appropriate hardware, known per se, for routing any computer binary data, such as from a web server, in lieu of routing telephonic data by using telephony hardware and software. Further, in the present invention, as explained herein, at the database system back-end the searching of data is done automatically via hardware and software, and the fact that one may also optionally insert a live human operator to aid in the directory assistance search, as explained in one embodiment of the invention herein, doeS not detract from the automated nature of the present invention.

In step 20 of FIG. 1, labeled "Match Caller Request to List of Vendor Candidate Telephone Numbers", a caller's telephone request for a vendor is matched by the software of the present invention to a list of vendor candidate telephone numbers found from database 30, so that data from a telephone call may be identified and matched with data residing in a database, and the incoming call may be appropriately routed by the software system comprising the present invention, e.g. if the caller is requesting a plumber that works in Los Angeles, the database 30 will be queried for LA plumbers and a suitable list of potential candidate vendors of plumbing services will be found. To further identify a caller request, an expert system working with voice recognition software (which includes any other interactive voice response) may guide the calling party user and elicit further responses from the user. For example, if the calling party requests a taxicab, the expert system might ask a series of questions, that lead to further questions, such as: "Do you need a pick-up within the hour?", and, if not, "Do you need a pick-up later today?" or "Do you need a pick-up later this week?", or, "What time do you need a pick-up?"; "How many people in your party?", and, if the number of people exceed say four, "Do you want a town car, a stretch limo, or a van?"; as well as, "Do you request a price quote?"; or "Do you wish to speak to a live operator?".

In decision diamond step 40, labeled "Vendor Candidate Telephone List Exhausted?", each of these potential candidate telephone numbers (assuming there is more than one) will be examined in turn, in order to determine the potential candidate(s) best suited for the job, in accordance with a QOCS methodology as explained further herein.

Though a single vendor, unknown to the public, can have a number of different candidate telephone numbers and thus appear to be different vendors to the public, the usual case assumed in the present invention is for a particular candidate vendor to be associated with one or more telephone numbers, though in no way is the present invention limited by hidden associations between vendors and telephone number(s). Furthermore, in a preferred embodiment of the invention rather than a telephone number or numbers being associated with a vendor, the database is provided with a key comprising a unique identification number (unique ID) that is used to identify a merchant with one or more telephone numbers. Throughout this application a telephone number is discussed in connection with a vendor for expository purposes, however, consistent with database development and database theory, in practice a unique ID may be used as a key to be associated with a vendor name. Using a unique ID one skilled in the art can identify a merchant vendor and keep track of any rating of this vendor, even if the telephone number(s) associated with the merchant constantly change (whether the telephone numbers change haphazardly or change by design, as perhaps if the vendor was trying to disassociate themselves from a poor rating by changing their telephone number). However, the use of a unique ID to track vendors associated with a telephone number(s), rather than tracking the telephone number(s) themselves as taught herein for clarity of exposition, does not in any way change the underlying nature of the invention as described herein, and the use of such a unique ID is a database programming detail well within the scope of the invention as taught herein. Therefore, for clarity and ease in exposition it is assumed throughout the present disclosure that a candidate telephone number (or numbers) is/are the equivalent of, and/or can be tracked by, a unique ID that is associated with one particular merchant vendor (i.e., the called party).

If there is more than one candidate telephone number, the flow of the program continues along the "No" branch of decision block 40 to decision diamond step 50.

At decision block 50, labeled "Relevancy Score Parameter List Exhausted For Particular Vendor Candidate Telephone Number?", a decision step is reached regarding the methodology for determining the QOCS for any particular telephone number. The QOCS is determined by analyzing any number of historical parameters (e.g. historical data) that are associated with the telephone number, and assigning a rating to the telephone number based on any grouping of the historical parameters or data. The historical data or parameters are simply data associated with the telephone number gathered from previous callers to the number. To give a simple example, a historical datum or parameter might be the number of times the telephone in question gave a busy signal when dialed. A telephone number that is frequently busy would receive a lower QOCS rating than one that was not always busy, all other factors being equal. However, whether or not a lower or higher rating is assigned for particular historical data is not paramount to the present invention; perhaps even a low QOCS rating would be useful to know in a quality assurance survey. Further details for one methodology of grouping the historical parameters and data as a weighted sum are given below.

Initially, the first time the decision diamond 50 is reached, the program will proceed along the "No" branch to step 60, the box labeled "Query Db Telephone Number For Parameter In Question". A database 30, which typically is the same database throughout the invention, is queried for a series of parameters that comprise the QOCS for a particular telephone number from the vendor candidate telephone number list, with the parameters as explained further herein. In step 70, labeled "Update Relevancy Score for Vendor Telephone No. in List", the relevancy score for the particular telephone number is computed for the particular parameter in question, and the process is repeated by proceeding back to decision diamond step 50 until all the parameters from a parameter list are exhausted, at which point flow of the program proceeds along the "yes" branch to decision diamond 50, and the next vendor candidate telephone number is examined in step 40 to determine its relevancy score, and the process is repeated.

The steps in steps 50, 60, 70 are for expositional purposes shown as a sequential determination of the relevancy score for a particular telephone number, in accordance with historical data or parameters associated with the telephone number, with each parameter examined one at a time from the database 30. In fact, however, the relevancy score can be computed beforehand for a particular candidate telephone number, without the need for a sequential querying of the database 30. Further, though a relational database is preferably employed for database 30, in fact any kind of database can be employed, even a flat file simply storing data, or hierarchical or object databases. Further, database 30 is shown in FIG. 1 as a single database but in fact can be multiple databases, even distributed in a network.

Flow of the program of FIG. 1 proceeds, once all candidate telephone numbers are assigned and associated with a relevancy score, along the "Yes" branch of decision diamond 40, to box step 80 labeled "Present Sorted Vendor Telephone List to Caller". There, a sorted list of candidate telephone numbers is presented to the caller, generally with the highest ranked QOCS telephone numbers presented first, as ranking was determined by the relevancy scores for the different telephone numbers obtained from the previous steps. At this point, as explained further herein, the caller makes one or more calls to called parties (vendors) associated with the vendor candidate telephone numbers. Once the call(s) are made by the calling party, in step 90, labeled "Update dB with any Post-presented call statistics", any statistics, as explained further herein, associated with any call(s) made by the calling party are recorded in the database 30. The database 30 is updated with these post-call statistics, in order to update the relevancy scores associated with the telephone numbers stored in database 30, for future use by the program for subsequent callers to these numbers. In step 100, the program ends.

As taught herein, telephone numbers that are ranked with the highest Quality of Customer Service/Satisfaction (QOCS) scores are presented first to any calling party (i.e. to the consumer of directory assistance searches). The QOCS is determined by a relevancy methodology that produces a relevancy score for every telephone number (and consequently every vendor(s) associated with this number). The relevancy score is comprised of a plurality of parameters, historical data or factors relevant to the telephone number; in one preferred embodiment, the relevancy score is presented herein as a weighted sum.

Thus, regarding the weighted sum formulation for the relevancy score, the parameters or factors p(i) that constitute the relevancy score or QOCS relevancy score is termed "RS" (Relevancy Score/Relevancy Sum). RS can be considered, by way of example and not limitation, as the weighted sum of a plurality of factors p(i) such that (eq. 1):

$$RS=\Sigma(\alpha(i)*p(i))=SUM(\alpha(i)*p(i)) \quad \{\text{equation no. 1}\}$$

for all i in a series of parameters, where $\alpha(i)$=the $i^{th}$ coefficient constant in a series, e.g. a decimal fraction acting as a weighing factor, and p(i)=the $i^{th}$ QOCS parameter in the series constituting the QOCS relevancy score, sum RS.

To illustrate equation no. 1 more concretely, consider a relevancy score that will judge a merchant vendor and assign them a score according to two parameters p(i): p(1), how many calls out of a total number of historical calls that are not answered, and, p(2), the average length of calls answered (measured in seconds). Further, regarding the coefficients, calls that are not answered, p(1), are afforded twice the weight (i.e. twice the importance) assigned to the average length of calls, p(2). Hence a(1)=⅔=0.67 while a(2)=⅓=0.33. Suppose Vendor #1 has 50% of calls not answered (as measured from a database recording total calls made in the past), with an average call length of calls answered for Vendor #1 of 30 seconds, while Vendor #2 answers 90% of calls, with only 10% not answered, and an average call length of 120 seconds per answered call. Suppose the average call lengths are normalized between the two vendors, as a percentage of the total, such that for example Vendor #1 has 10 calls averaging 30 seconds, for a total of 300 seconds of answered call time, while Vendor #2 has 50 calls averaging 120 seconds, for a total of 6000 seconds (50*120), giving a total of 6300 seconds of answered call time between the two vendors. Thus, normalizing the answered call time, Vendor #1 has 4.76% of the total answered call time (300/6300) while Vendor #2 has 95.2% of the total time (6000/6300).

RS in this example for the two vendors equals: RS (Vendor #1)=0.67*(0.50)+0.33*(0.0476)=0.335+0.016=0.351; while RS (Vendor #2)=0.67*(0.90)+0.33*(0.952)=0.603+0.3142=0.917. Or, on a scale of 0 (worse) to 100 (best), Vendor #1 scores 35.1 while Vendor #2 scores 91.7. Vendor #2 offers a higher Quality of Customer Service/Satisfaction (QOCS) over Vendor #1 in this example, because presumably vendors that answer phone calls more often, and spend more time on the phone with customers per call, can be assumed to be servicing their customers better and closing more sales. However, whether or not these assumptions regarding percentage of answered calls and length of answered calls are in fact true (as opposed to believed to be true) in determining customer satisfaction, QOCS, vendor success, or any other related thing being measured, is immaterial to the present invention. What is important is that some relevancy score can be assigned to the vendors using some set of historical data or parameters, with suitable predetermined and arbitrarily assigned weighing factors, as taught herein. Further, eq. 1 is in no way limiting to the invention—for example instead of summing the parameters p(i) one may chose to multiply them together. Or, parameters p(i) may be considered as forming for RS a polynomial equation so that the terms p(i) are raised to some $n^{th}$ power, and multiplied by the coefficients $\alpha(i)$. In addition, the weighing of the parameters (the value of the decimal fraction weighing factors in eq. 1 above), as well as the number of appropriate parameters (p(i) in eq. 1 above), can be adjusted, added to, deleted or combined in any arbitrary manner in light of additional survey evidence made in the field by researchers measuring QOCS and/or vendor success, as can be appreciated by one of ordinary skill from the teachings herein. The user of the system, e.g. the calling party, could even be invited to input preferences that would dynamically adjust the weighing factors (e.g. "If your call cannot answered, do you want to leave voicemail? Press 1 if you don't mind, Press 2 otherwise"). The calling party can likewise chose from a list of vendors and be presented with their QOCS relevancy scores and/or parameters comprising the QOCS relevancy scores, and/or the system can automatically default to present first to the calling party the vendor with the highest QOCS relevancy score or a parameter constituting the QOCS relevancy score. Further, the above example with two parameters is simply illustrative of the process used to determine the relevancy score using only two parameters, and not meant to be limiting to the invention.

In the present invention, a single parameter can be employed to calculate the relevancy score, or many more than just two parameters can be employed for calculating the relevancy score. By way of illustration but not limitation, the following historical data and/or parameters, termed QOCS parameters, are disclosed as useful parameters that may be used in a methodology to compute a relevancy score—e.g. a relevancy score such as RS shown by equation no. 1—for rating called parties.

Parameters Useful for a Relevancy Score

Disconnected Numbers—disconnected telephone numbers are a factor that can be used above for the relevancy score, such as in eq. 1. A disconnected number presumably is annoying to a caller and would, all other things being equal, result in a lower relevancy score. If a calling party calls a called party using a disconnected telephone number (that is, the number either does not exist or no call can be completed as dialed), and a disconnected number message is returned by the program of the present invention, the status of the call is noted (e.g. the fact that the number is a disconnected number, and explicitly or implicitly including information such as the time and/or date of the call). The telephone number associated with the called party (e.g. vendor) is updated with the status information that a disconnected number was reached, and this information is updated in a database by the program.

Busy Signals—if a calling party calls a called party using a particular telephone number and a busy message signal is returned, the status of a busy signal call is noted by the program (e.g. the fact that the number produced a busy signal, and explicitly or implicitly including information such as the time and/or date of the call). A busy signal would result in a lower relevancy score, all other things being equal. The telephone number associated with the called party (e.g. vendor) is updated with the status information that a busy signal number was reached, and this information is updated in a database by the program.

No Answer or Not Answered—if a calling party calls a called party using a particular telephone number and the call is not answered after a predetermined number of rings, e.g., 4, 5, 6, 7 or more rings, the call is marked as unanswered/not answered. The telephone number associated with the called party (e.g. vendor) is updated with the status information that the call was marked a no answer/not answered, and this information, including explicitly or implicitly any additional information such as the time and/or date of the call, is updated in a database by the program. An unanswered/not answered call would result in a lower relevancy score, all other things being equal.

Answering Machine/Voicemail/IVR—if a calling party calls a called party using a particular telephone number and the call is connected to an answering machine, voicemail box, or IVR (Interactive Voice Response application), the call is marked as AM/VM/IVR. The telephone number associated with the called party (e.g. vendor) is updated with the status information that the call was marked AM/VM/IVR, and this information, including explicitly or implicitly any additional information such as the time and/or date of the call, is updated in a database by the program. A call marked AM/VM/IVR would result in a lower relevancy score, all other things being equal. In the art there are known per se hardware and/or software devices for determining when an answering machine, voicemail box or IVR receives a call, as opposed to an actual (live) person.

Average Call Length—if a calling party calls a called party using a particular telephone number and the call is received by a live person, the length of time elapsed in the telephone call connection between the calling and called parties is noted. The telephone number associated with the called party (e.g. vendor) is updated with the status information regarding this length of time, and this information, including explicitly or implicitly any additional information such as the time and/or date of the call, is updated in a database by the program. Further, the database may store data associated with a particular telephone number belonging to a vendor to include information such as the average call length (e.g. in seconds) associated with the particular telephone number, with the average chosen for any arbitrary or predetermined period of time (e.g. a range of dates, say a period over the last 90 days). In addition, calls that are not answered/no answered or marked AM/VM/IVR may be assigned a call length of zero. By way of illustration but not limitation, one theory in Quality of Customer Service/Satisfaction (QOCS) is that a call having high QOCS is correlated with a high average call length, under the premise that short calls in most industries are likely calls that did not result in many meaningful interactions (such as appointments or sales). Thus a telephone number associated with a low average call length would result in a lower relevancy score for that number than a telephone number associated with a high average call length, all other things being equal.

Consumer Feedback—when a calling party calls a called party using a particular telephone number, a calling party may be prompted by the program of the present invention to rate the merchant at the conclusion of the call, e.g. via a simple binary "Yes/No" prompt on the calling party's mobile phone asking an answer to the question "Called Party (Vendor) was helpful?". This information may be collected by the program of the present invention and stored in a database, and associated with the telephone number of the called party, including explicitly or implicitly any additional information such as the time and/or date of the call. Furthermore, as explained further herein, consumer calling party feedback may be solicited at any time, during or after a calling party makes a call (i.e., not necessarily in real-time during the placement of the call), so that a calling party may be asked via a live operator, via an email, or via an automated call whether the called party was helpful, and any response from the calling party regarding either the called party or the call may be stored.

Average historic relevancy score (AHRS)/Differential historic relevancy score (DHRS)/Statistical parameters—an average historic relevancy score (AHRS) or differential historic relevancy score (DHRS) can be used to rate telephone numbers. Regarding the average historic relevancy score (AHRS), the relevancy score RS of equation no. 1 for a particular telephone number associated with a called party (vendor) may be stored in a database as a running average (an average computed as more and more calls are made to the particular telephone number) to comprise an average historic relevancy score (AHRS) over a particular time period (e.g. a range of dates). This average historic relevancy score (AHRS) may be associated with any new, additional call made to the particular number by a calling party (i.e. a new call made after the prior calls were made), including explicitly or implicitly any additional information such as the time and/or date of the new, additional call. The advantage of storing the average historic relevancy score (AHRS) of a particular telephone number, whenever any new call is made by the calling party to the particular telephone number, is that computation of the average historic relevancy score (AHRS) for that number is made quicker and easier, since the average relevancy score information has already been computed and is available immediately. However, as can be appreciated by one of ordinary skill in the art, computation of the average historic relevancy score (AHRS) for a series of calls can be done at any time, including in real time when a new call is made, depending on the computing hardware available, the amount of computer memory, the number of prior calls, and the like. In addition, rather than just an average historic relevancy score (AHRS), a parameter in this category can include a differential historic relevancy score (DHRS), based on the relevancy score RS of the last N calls made (e.g. the average of relevancy scores of the last three calls associated with a particular number), and/or can be a relevancy score that shows whether the relevancy scores associated with a particular telephone number are rising or falling over any arbitrary time period; this is termed a differential historic relevancy score (DHRS). Further, the number of calls made to a particular number (i.e. 'number of calls') can be recorded, which is useful for statistical calculations of the QOCS relevancy score, since presumably a vendor with a relevancy score of "10" on some arbitrary scale, as a result of 5000 calls, is more likely to have a more accurate QOCS relevancy score that should be afforded greater weight than the same QOCS relevancy score from a vendor receiving far fewer calls, say only five calls. Other statistical measures, such as standard deviation of data, may be employed on the data collected by the present invention.

Spam—when a telephone number associated with a called party (vendor) is determined to be a number from which unsolicited calls are frequently made, e.g. cold calls from telemarketers, hereinafter a spam telephone number, the spam telephone number can be assigned a score reflecting it is spam, and this will influence the relevancy score for the particular spam telephone number, resulting in a lower relevancy score for the number, all other things being equal.

Vendor placement, advertisement or lead fees—called parties (vendors) can pay a fee to the licensee or owner of the present invention to have their candidate telephone numbers placed higher in the relevancy score ranking than would otherwise be the case.

Timeliness/Price/Quality—the timeliness of the vendor associated with a particular telephone number, as timeliness is measured by any objective or subjective manner, may be employed as a parameter for determining the relevancy score of the telephone number. Timeliness may be measured by a survey, such as a post-sale survey, or in response to a real-time query by the calling party (e.g. "need emergency plumber now—are you available within 1 hour?"), or in response by a vendor to an automated question from the program of the present invention, which may be asked before or during the call by the calling party, as explained further herein. Further, price may likewise be a parameter (e.g. "need the plumber's hourly rate to be less than $65 an hour"), that may be set by the calling party. Finally, quality of the goods or services may be a parameter, as measured by grading (e.g. Grade A USDA produce; "fine" or "extra fine" designations), the number of Better Business Bureau or regulatory agency complaints against the called party associated with a telephone number, post-sale surveys of the quality of goods and services provided, and the like.

Financial and business data—financial ratios such as the total sales revenue of the vendor associated with a particular telephone number, number and geographic location of stores of the vendor, market capitalization and the like may be parameters to any relevancy score rating of the telephone number. Other such business and financial data for use in a relevancy score may include: competitive advertising spending; founded date; company size (employees); revenue; category (line of business); address (residential vs. commercial); geography (MSA); call volume; single franchise location, or multi franchise location; franchise, or chain; credit and lines of credit; number of phone lines; number of outlets (local, super-local, regional, national); square footage; type of phone (business, cell); and private versus franchise.

Miscellaneous data—the parameters used for the relevancy score ranking in the present invention are not limited to just the above examples, which are illustrative and not limiting. Any form of additional, user-defined data may be associated with a particular telephone number and be used to rank the telephone number, without limitation. This includes but is not limited to something as basic as associating the gender of the vendor associated with a particular telephone number, so that a caller requesting a female pediatrician can be accommodated by the relevancy ranking methodology of the present invention. Subject to all applicable privacy and discrimination laws, the age, gender, race, nationality, languages spoken, education, religious affinity and numerous other personal characteristics of a vendor associated with a particular telephone number are also possible as historical data or parameters, classified as personal miscellaneous data. Photographs of the called party and graphics associated with the called party (e.g. a business logo) can also be classified as miscellaneous data associated with a telephone number. Thus a movie director who wants to query the program of the instant invention for telephone numbers of actors under age 25 that have blond hair and are living in Los Angeles can, if a photograph is associated with the telephone number, and using suitable photo image recognition software, find all such actor telephone numbers in an automated fashion. Another form of miscellaneous data might be popularity, as popularity is determined from relevancy scores in the database from previous calls to vendors in the same field and/or geographic area, or simply as the vendor that gets the most calls. A further example of miscellaneous data could be the latency of a website associated with a called party, with a company penalized in relevancy score if it does not support adequate IT infrastructure to support a fast response. Numerous other examples along these and other lines should be apparent to one of ordinary skill in the art using the teachings herein.

Figure 2A:
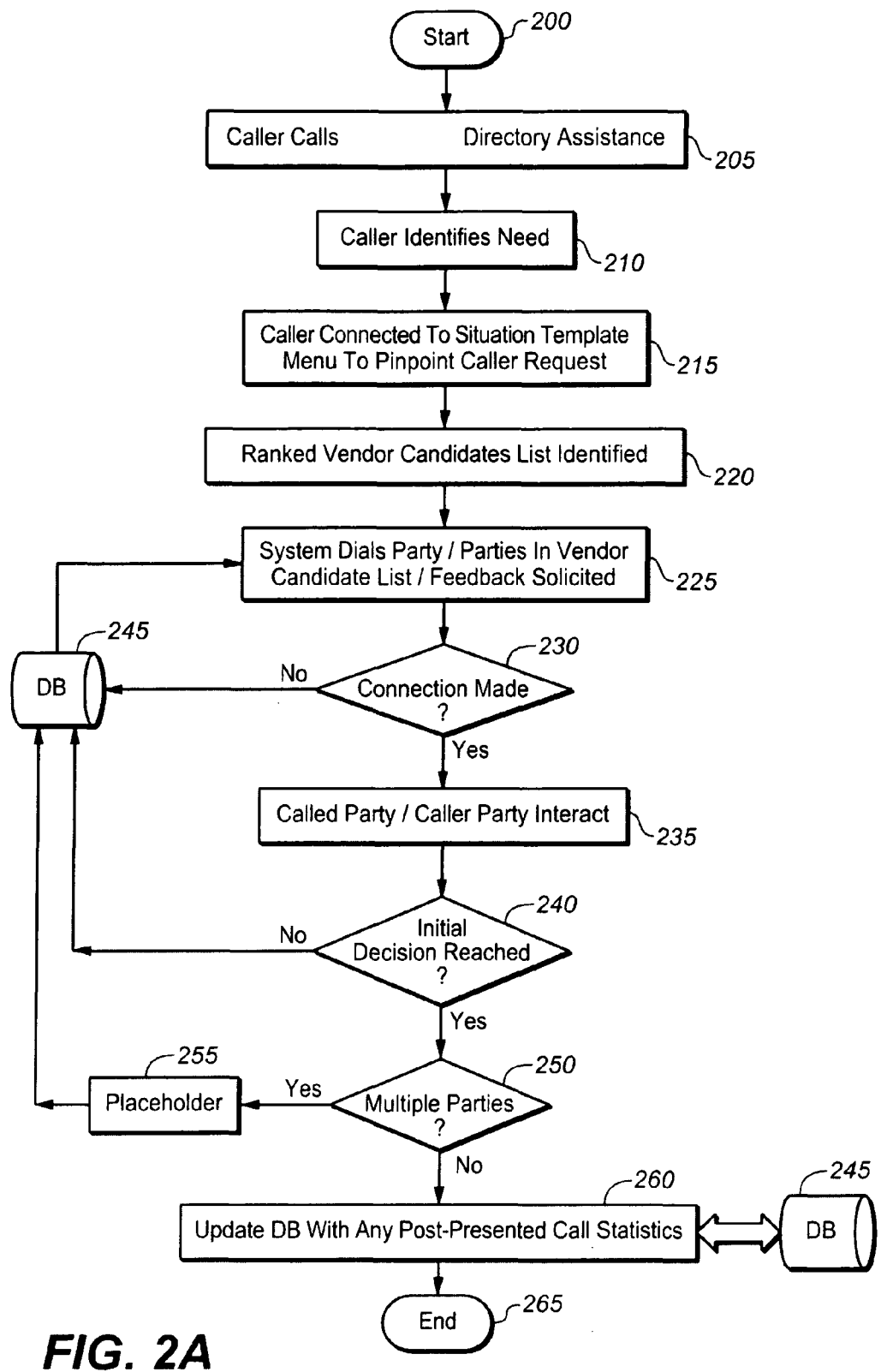
FIG. 2A shows a flowchart according to the present invention for providing a calling party with one or more called party telephone numbers.

Turning attention now to FIG. 2A, there is shown a flowchart according to the present invention for providing a calling party (typically a consumer, customer or user of directory assistance searches) with one or more called party (e.g. vendor) telephone numbers. In step 200, labeled "Start", the program starts. In step 205, labeled "Caller Calls Directory Assistance", the caller calls a number, e.g. 800-FAST-411, that interacts with the hardware and software of the present invention, which can include a PBX (or Centrex and the like), fast internet access, computer system and any other hardware and software necessary to interface with the user, as are known per se in telephony and information technology. The system of the present invention preferably tries at all times to maintain connections within the system between the user-caller and the vendor-called party, thus acting as middleware/a middleman, in order to better service them and collect information from them. In step 210, labeled "Caller Identifies Need", the caller identifies a directory assistance need, such as a taxicab ride, which may be recognized by an expert system using voice recognition technology (or other interactive voice technology, such as an IVR system using a touch pad or other input device). Another aspect of the invention, which can be implemented anywhere within the present invention, such as at step 210, is to assign one or more local phone numbers to categories of advertisers to receive telephone calls from calling parties seeking businesses in specific categories and in specific geographies. For example, an advertising campaign may instruct consumers to call "800-LA-PLUMR" for the category of quality plumbers that operate in the Los Angeles region. The called party plumbers could be monitored by the present invention for quality assurance purposes, as taught herein, and could be rotated into and out of a specific category based on how high a QOCS rating they achieve. Thus, the specific local phone numbers (DID—Direct Inward Dial—numbers), in this example "800-LA-PLUMR", will, when dialed, reach called parties in the same category of business (e.g. plumbing), and in the same geography (e.g. Los Angeles), but the specific called parties behind the scenes will vary. The order that called parties receive calling party calls may vary according to, by way of example, how high a QOCS score the called parties achieve over any particular time period, with the top ranked called parties retained to be called first by the calling party, and the bottom ranked called parties periodically rotated out in favor of new called parties. The parties can in fact be ranked over time as simply the top N called parties (where N=an integer) as identified by the system of the present invention. Thus, inclusion in the list of plumbers for the example of "800-LA-PLUMR" would be those N plumbers that overall rank high in QOCS as identified by the system when consumers call for plumbers, where the plumbers reside in the Los Angeles region.

In step 215, labeled "Caller Connects To Situation Template Menu To Pinpoint Caller Request", the caller connects to a user interface of the program, which also may be driven by an expert system that elicits further information from the caller in response to the caller's initial request in step 210. The system in step 215 interacts with whatever hardware the caller is using, in order to receive input from the consumer (e.g. a mobile phone having a display; or automated voice recognition software in the program interacts with the spoken words or touch tone keypad inputs of a caller that is using a landline telephone handset).

Figure 2B:
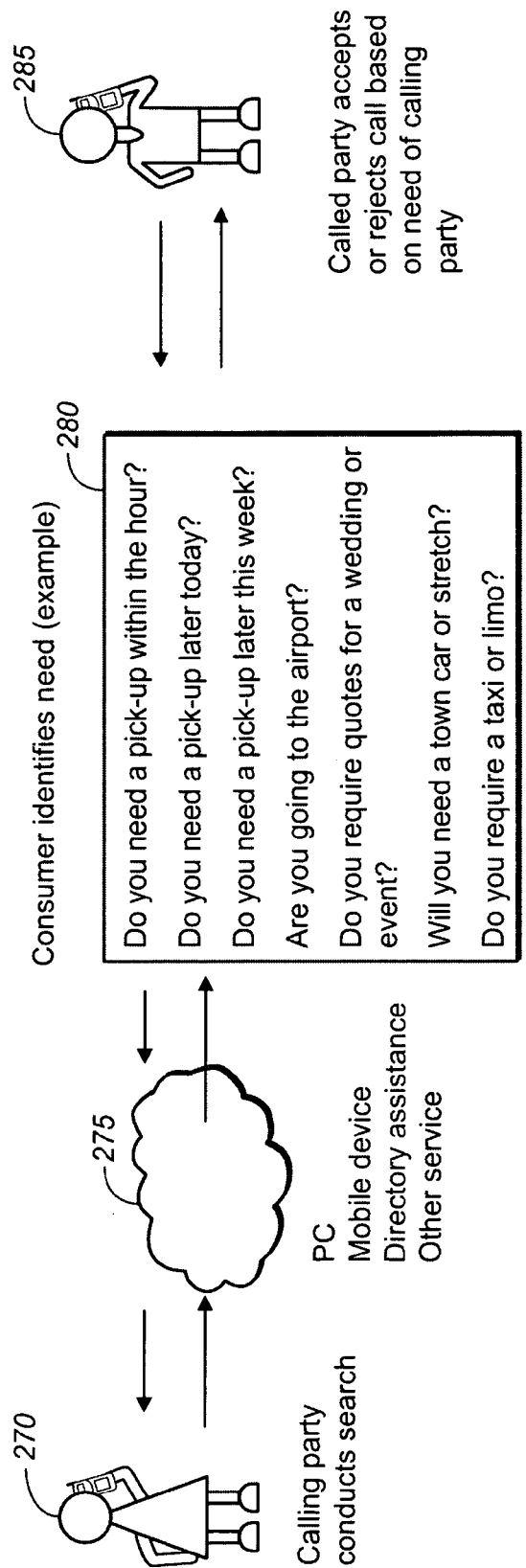
FIG. 2B shows a schematic of how a caller may interact with a called party, prior to being connected to the called party.

An example of the further interaction of step 215 is shown in FIG. 2B, showing a calling party (consumer user) 270 who identifies a need (or, equivalently, initiates a search), as in step 210 in FIG. 2A. The consumer calling party uses suitable hardware and/or software 275 at the user's end to access the system of the present invention (e.g. PC, mobile device, a bridge directory assistance service that calls into a toll-free number for the present invention, e.g. 800-FAST-411). The caller consumer then is shown (or hears) a situation template, in FIG. 2B shown as menu 280, that most closely matches the callers request for service as determined by an expert system or otherwise. In the example of FIG. 2B, the caller 270 has requested a search for a taxi, and the situation template menu 280 gives the caller a number of options to help pinpoint the user's needs, including such standard questions like "Do you need a pick-up within the hour?", and "Are you going to the airport?" and the like. Questions reasonably related to activities that may be inferred by an expert system may also be asked, e.g. "Is this taxi for a wedding or event?", and, if the caller answers yes, the system can ask "Do you require stretch limousine quotes for a wedding or other event?", and "Do you require fresh cut flowers?" and so forth. Even pricing requests can be initiated by the caller to the system at this stage (e.g. the caller may ask the system "Can you take a group of four to the airport for a flat fee of $100 or less?"), and this information can be used by the system to query vendors, who can input their responses to the system, as explained further herein. In the event the situation template is not adequate to pinpoint the caller's need, means can be provided to allow the caller user to input a user-defined answer or question, or the system can forward the caller to a live human operator that can provide assistance. Calling parties may also record a message to be played to called parties. Calling parties may also request an automated call back from called parties (e.g., leaving a voicemail or the calling party asking that the called party contact them via a call back feature).

After the caller identifies the need from the situation template or otherwise, flow of the program proceeds to box 220 of FIG. 2A labeled "Ranked Vendor Candidate List Identified". In step 220, the methodology discussed in connection with FIG. 1 is employed to rank a plurality of merchant vendor telephone numbers that are likely candidates to call in order to fulfill the caller's need. The consumer can be presented with a list of candidate vendor phone numbers, ranked from best to worse (a predetermined arbitrary ranking as determined by the Relevancy Score as discussed herein), and the consumer can select to dial any candidate vendor from the list presented.

Figure 2C:
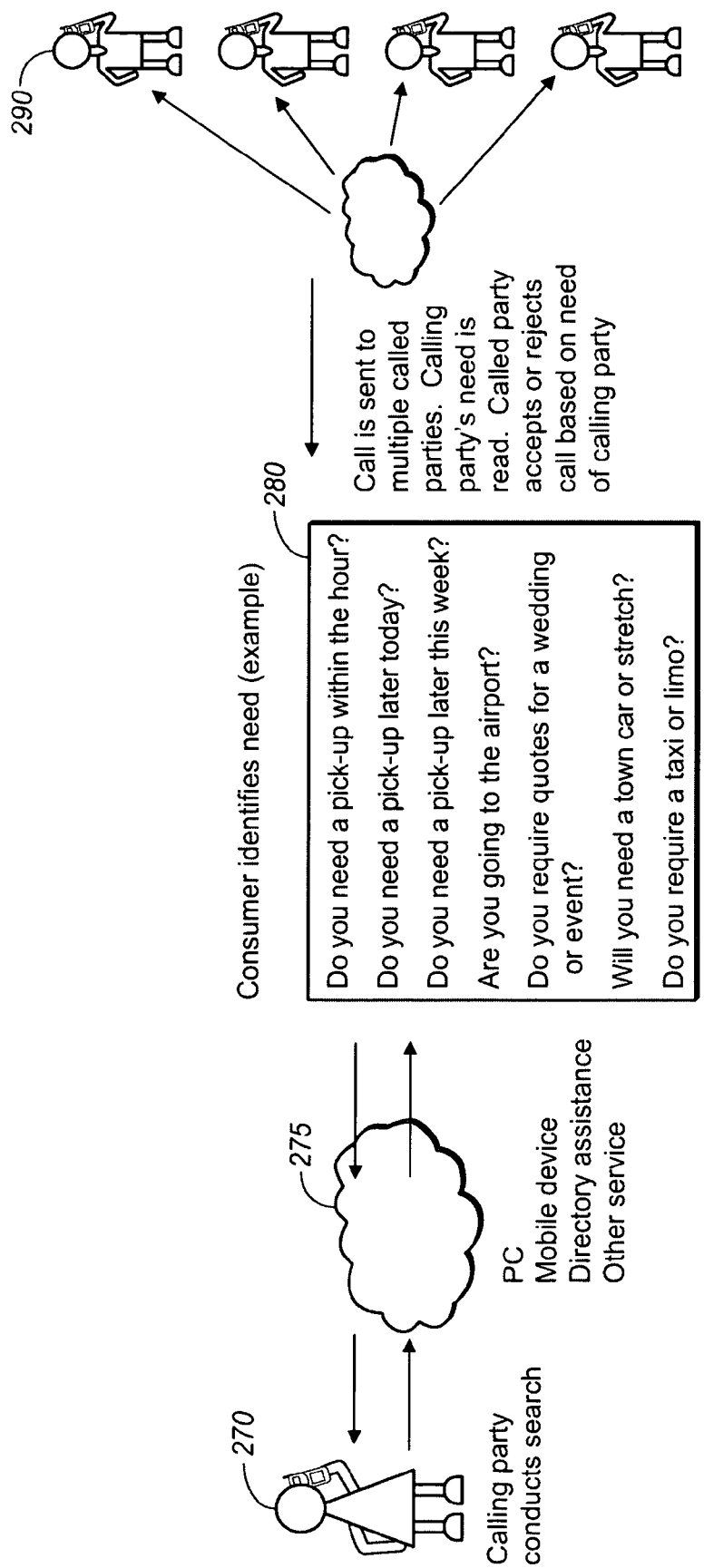
FIG. 2C shows a schematic of how a caller may interact with multiple called parties, prior to being connected to the parties.

In addition, concurrently with step 225 in FIG. 2A labeled "System Dials Party/Parties in Vendor Candidate List/Feedback Solicited", the program of the present invention can in parallel dial multiple vendors automatically and present a list of demands as identified by the calling party consumer in the menu 280 of FIG. 2B—this can be done behind the scenes, unknown to the consumer, who can be placed on hold. The vendors (the prospective called party), such as called party 285 in FIG. 2B, can accept or reject the potential call by the consumer based on these demands. The demands may be read to the vendors by the software system of the present invention through automated recorded speech; likewise, the calling party may have their input recorded by the software system through voice recognition software. If the vendors reject the consumer's demands, the vendor can be eliminated from the vendor candidate list, step 220 of FIG. 2A. This parallel dialing feature of the present invention is shown in FIG. 2C, showing the same elements as in FIG. 2B but with multiple vendors 290 that may accept or reject the demands made by the consumer, and thus accept or reject the potential call. In addition, feedback may be solicited from these vendors via a menu of options that appear on the vendors telephony display, to further screen the candidate vendors; for example, the caller may request whether a vendor is open after 6 pm. The candidate vendors could have a menu appear on their phone or PC display that states "A caller is asking if you are open after 6 o'clock pm. Press '1' for Yes, '2' for No". Optionally additional feedback, typically text or voicemail feedback, may be sent from vendors to the calling party at this or another stage. By way of example and not limitation, a vendor could reply to a calling party request for a price quote for a good or service by entering a price quote. This price quote can constitute a bid by the vendor to the calling party, and if multiple vendors are contacted by the calling party, the calling party may be offered a menu of bids, including first the vendor offering the lowest bid, so the calling party can more readily select the lowest bid, and/or optionally the QOCS relevancy score or any particular QOCS parameters associated with each vendor, so the calling party can select a particular vendor from a list of vendors.

Further, during this parallel dial process of step 225, candidate vendors may be automatically connected by the system to a service center after receiving a list of demands or inquiry from a caller. This would be an option from a menu of options before the vendor's telephony system, and would be useful if the vendor needs approval from headquarters, a home office, or needs additional support, and would obviate the necessity for the vendor to place a separate manual call.

Once feedback is completed from any parallel dialing of vendors in step 225 of FIG. 2A, the calling party consumer is given an option to interact live with any of the remaining candidate vendors who have been vetted and culled by the system so far. These vendors are the most likely vendors to satisfy the prospective called party's needs, ranked from best to worse according to the relevancy score methodology as explained in connection with FIG. 1. In decision block step 230, labeled "Connection Made?", a check is made to see if a connection is made; if so, the call proceeds to the next block, if not, the "No" branch is taken and, in accordance with the relevancy score rating methodology discussed in connection with FIG. 1, a database 245 is updated to indicate the call failed (e.g. a No Answer or Not Answered call or a Answering Machine/Voicemail/IVR call) and the program can terminate. In step 235 of FIG. 2A, labeled "Called Party/Caller Party Interact", the customer and vendor can interact in person. At decision step 240, labeled "Initial Decision Reached?", if the caller makes a decision, meaning the caller tentatively decides to purchase the goods or services of the vendor, the flow of the program proceeds to diamond 250, labeled "Multiple Parties?", otherwise flow of the program proceeds back to block 225, as shown by the "No" branch at diamond 240, and the database 245 is updated regarding the relevancy score of the vendor under consideration, including any optional feedback from the consumer (e.g. "Called Party (Vendor) was helpful?"). As shown by the arrow in FIG. 2A, the program then continues to the next candidate in the vendor candidate list in step 225 and the process continues until such time an initial decision is reached at step 240. Regarding consumer feedback, the program of the present invention can lookup the area code and prefix (NPA/NXX) of the calling party and with some certainly know if the caller has called from a cell phone. If so, the present invention can then text message (SMS) the calling party and prompt them to rate the called party merchant. This can be done throughout the present invention when feedback is solicited from a calling party.

In decision diamond step 250 in FIG. 2A, the program checks to see if multiple parties wish to be called by the caller. This is a separate step from the parallel dial feature mentioned above in connection with step 225. The "Multiple Parties?" step of decision block 250 relates to whether the caller wants to comparison shop between multiple vendors. If so, the vendor with which the caller reached a tentative agreement (or initial decision) can be 'put on hold' or otherwise put into a standby mode, via a placeholder, such as shown by placeholder block 255, while the caller continues to shop for other vendors who may better meet her needs, and the loop of steps 225, 230, 235, 240 and 250 is repeated. During this time the vendors may optionally input information into the system to better inform the caller, such as a bid on a price quote. When such time that a final decision is reached and no more parties are either available or wish to be contacted by the caller, the caller can then, through a suitable interface, pick the one merchant from the list of merchants on hold or on standby that the caller wishes to engage for finalizing a transaction, and the transaction between the caller and that merchant can then be finalized. When this is done, there are no more merchant parties that remain to be contacted by the consumer caller, and the program flow continues to block 260 in FIG. 2A, labeled "Update Db With Any Post-Presented Call Statistics"; at this step the database 245 can be updated to reflect any new parameters affecting the relevancy score associated with the telephone number(s) of the vendor(s) involved in the calls initiated by the caller, in accordance with the relevancy score methodology discussed in connection with FIG. 1. In step 265, labeled "End", the program ends.

Furthermore, the present invention contemplates that at any time before, during, or after the placement of a call by a calling party, calling party consumer feedback may be solicited by the software any time regarding the call experience or the called party service. This feedback from the calling party may be initiated by the software to be made via a live operator, via an email, or via an automated call, asking whether the called party was helpful, and any response from the calling party may be stored in database 245 by the software of the present invention.

Turning attention now to FIG. 3, there is shown a flowchart according to another aspect of the present invention, a form of automated directory assistance, for screening calls that may involve "dirty numbers", that is, numbers previously assigned to a first party being assigned to a second party. This is an increasingly common problem, as new telephone numbers that have never been used become less common. This feature of the invention can be incorporated at the merchant vendor end of the system, in order to prevent wrong number calls to the dirty number. Preventing wrong number calls is important because advertisers often charge per call, and if the wrong number is being called, the second party will be unfairly charged for calls that belong to the first party.

Thus in FIG. 3, a program is shown for screening calls involving dirty numbers comprising the steps of assigning a telephone number to a second party, Party 2, that had previously been assigned to a first party, Party 1, as indicated by block step 300, labeled "Assign Telephone # to One Party, Party 2". In step 305, labeled "Monitor Calls Received by Party to Identify Patterns", calls are monitored, such as in a PBX interfacing with the telephone of Party 2, to monitor incoming calls received by Party 2. The calls received are monitored to identify patterns, and the results of these patterns are logged into database 310, which may be any kind of database but preferably a relational database, so that the data from incoming calls may be identified and matched with the data in the database, and the incoming call may be appropriately routed by the software system of the present invention. The patterns may be found by an expert system, e.g., using "IF-THEN" rules, and/or through heuristic or statistical means. For example, by way of illustration and not limitation, the monitoring may indicate that the vast majority of calls received and accepted by Party 2 (as explained further herein in connection with FIG. 3) are local calls originating in the 310 area code, while the few calls that are rejected by Party 2 as wrong numbers are calls originating in the nearby 213 area code; or the calls historically rejected by Party 2 may originate from a particular telephone number prefix, e.g. the 323 prefix of the 310 area code (which is the area of Gardena/Torrance), or the calls historically rejected by Party 2 may be a particular telephone number(s), e.g. 310-XXX-XXXX (where X are some digits from 0 to 9). The calls rejected by Party 2 could likely be calls intended for Party 1.

In step 315, labeled "Receive Calls", incoming calls are received for Party 2. In step 320, labeled "Rec'd Call Consistent w/ID'd Pattern?", if the received calls are consistent with a pattern or patterns, or set of rules, such as by the expert system identified in step 305, the calls are passed to Party 2, as indicated by the "Yes" branch that leads to step 325 labeled "Pass Call to Party 2". Otherwise, the incoming call is challenged, as indicated by the step 330 labeled "Challenge Call".

If, prior to, during or just after the real-time answering of the call by Party 2, Party 2 realizes the call received is a wrong number (likely intended for Party 1), Party 2 may reject the call, as indicated in decision diamond 335 labeled "Call Rejected by Party 2?". Rejecting the call may be done either prior to, during or just after receiving the call. Rejecting the call by Party 2 can be done with a suitable user interface at Party 2's phone, e.g. a mobile display that appears just before, during or just after the call that states: "Reject this Call?—Press 1; Keep this Call?—Press 2". A default option may be employed to accept all calls if no user input is received within a predetermined time interval. If the call is rejected, the flow of the program passes to step block 340 labeled "Pass Call to Party 1", and the call may be forwarded to another telephone number where Party 1 resides. If, on the other hand, the call is not rejected, the flow of the program proceeds to block 325 labeled "Pass Call to Party 2". In either event, whether or not the call is rejected or accepted, the data associated with the call, including the area code, three-digit prefix, 10 digit telephone number, time of day and other relevant data are noted by the program of FIG. 3 and the relevant data is recorded in the database 310, as indicated by the block step 345, labeled "Update dB". In this way this data recorded in the database may be used in the future by the expert system to screen subsequent calls received.

Screening of calls using the call screening feature of FIG. 3 is done automatically, with the help of input by the user as explained above; in addition, the system may allow additional manual input of data into the system, where Party 2 can manually specify certain telephone numbers be blocked from being received by Party 2, or always be accepted by Party 2. Party 2 can programably specify other rules for the system by manual input, such as always blocking all calls with the Gardena/Torrance prefix. Further, Party 2 can use the invention of FIG. 3 to block spam. In step 350, labeled "End", the program ends.

Turning attention now to FIG. 4, there is shown is a flowchart according to the present invention for targeting called or calling parties for solicitation, in response to QOCS relevancy scores. This is also a form of directory assistance search, albeit initiated by the owner or licensee of the present invention, rather than a member of the general public, as the calling party, using the software system and information stored therein to initiate a call to a vendor. The method of FIG. 4 involves using the present invention as described herein to solicit business from either a called party (vendor/merchant) who scores highly in the QOCS ratings, or, applicable privacy laws permitting, even a calling party (consumer) who is found to frequently engage in calls that result in sales.

Thus in FIG. 4, step 400, labeled "Query dB", the database, such as database 30 in FIG. 1 and database 245 in FIG. 2A, which could be a single or multiple databases, are queried, to identify good prospects for solicitation, as indicated by step 405, labeled "Identify Parties Using Relevancy Scoring". These good prospects would include vendors (called parties) that score high in the relevancy scores, such as scoring high in the relevancy score (RS) of eq. 1, or consumers (calling parties) that score high using any other equivalent relevancy score for consumers, using analogous parameters for consumers and consumer calling party telephone numbers, such as, by way of example and not limitation: calls made, average call length, sales finalized (e.g. as reported by vendors) and the like.

In step 410 of FIG. 4, labeled "Contact Parties Identified", the vendors and/or consumers identified in step 405 are contacted for solicitation of goods or services by a salesperson, which is the marketing attempt. The results of the marketing attempt, whether successful or not, are logged in a database, as indicated by step 415, labeled "Update dB". In step 420, labeled "End", the methodology of the program ends.

The program of FIG. 4 is preferably automated so that a computer system carries out all steps except preferably the contacting of the parties at the marketing attempt of step 410, labeled "Contact parties identified". This marketing attempt step is preferably handled by a human salesperson who is automatically connected to an identified party by the program of FIG. 4, though an automated, prerecorded marketing attempt can also be performed and within the scope of the present invention.

A typical transaction via the method of FIG. 4 would not be the "cold call" that is traditionally unsuccessful in telephone marketing; rather, the human operator of the marketing attempt would be reaching a vendor who likely owes a measure of their success to the present invention, and would be grateful to the owners and licensees of the present invention for the customers referred to them by the present invention. Thus the method of FIG. 4 is likely to be more successful than a traditional "cold call" sales pitch.

Turning attention now to FIG. 5, there is shown a method of using the present invention involving charging an advertising fee to a called party who accepts a call completed through the present invention. In step block 500, labeled "Calling Party States Need For Their Call", a calling party (customer) calls a number, e.g. 800-FAST-411, and is connected to a called party (vendor) in accordance with the methodology of FIG. 2 of the present invention, as indicated in step block 510, labeled "Call is Placed Using System of FIG. 2". The customer interacts with the vendor, as indicated by step block 520, labeled "Called Party Interacts with Calling Party". Once the interaction is completed, a listing or advertising fee is assessed by the owner or licensee of the present invention against the vendor, as indicated by step block 530, labeled "Advertising Fee is Assessed". The fee may depend on whether or not the customer—vendor interaction resulted in a sale (or, equivalent, an appointment that may lead to a sale), with a lower fee assessed for a non-sale (or non-appointment).

The listing fees of the present invention may be based on distribution of a directory measured in circulation (number of persons receiving and using the directory). The listing fee may be based on usage and measured in the number of searches, queries, listed results, unique users, and unique telephone calls to the business party or other measures of usage of the directory or measures of communication between the searching party and the business party, as when these activities are performed in connection with the present invention. The listing fee may be based on specific requests for information including requests for a business party's phone number, physical address, and/or email address, as can be tracked by the present invention. The listing fee may be based on email communication, text messages, fax messages, voice messages, and other communication sent to the business party.

Yet another aspect of the present invention as disclosed herein, that can be used in any of the embodiments, is as follows: immediately after a merchant (vendor) has received a consumer call from the system of the present invention, the system will call the merchant with a recorded message explaining the service provided by the system to the merchant (as the merchant may be unfamiliar with the service provided by the system of the present invention), allowing the merchant to be connected back to any additional sales center affiliated with the system. The system of the present invention will also allow the merchant to leave a voicemail message, or leave their email address so that the owners or licensees of the present invention may forward additional information via a call or email.

Turning attention now to FIG. 6, there is shown a web interface for practicing the present invention using the internet. A customer user (calling party) connects to a website and is shown a web page interface such as shown in FIG. 6, optionally after logging on to their account. A search is conducted by the customer by typing in a keyword, at field 610

(or from browsing a predetermined category), and optionally filling out or browsing a preferred location, at field 620. Thereafter, a search button is clicked (button 630) and the server at the back end of the web page finds a plurality of vendors, such as, in this example, for LA plumbers, at listing 640. These vendors have been rated according to the methodology of the present invention, involving a relevancy score. A preferred vendor may be listed at the very top, such as at 650. The customer then can input their telephone number and call, such as at field 660, and/or click a link of the vendor the customer wishes to engage, such as the link at 670, labeled "call" and listed next to the name of each vendor (or within other positions in the user interface). In addition, the customer can click on multiple vendors in the selected category and city, and dialing can be done in parallel as explained further herein in connection with the customer using a telephony interface. The server powering the web page then connects the selected vendor(s) with the phone number inputted by the consumer, and the system of the present invention then calls each party and connects the parties together, all the while the system remaining in the loop as middleware and/or a middleman. The consumer number, and other account details of the consumer, such as a default location, can be saved in an online account by checking a checkbox, such as checkbox 680 labeled "Save this number", and other similar checkboxes. The website may also include a map (e.g., from Google Maps) that shows where the vendors are located or gives directions, and/or otherwise acts as a mashup between various sources of content and data. The mashup can be supplemented by GPS satellite signal receiving hardware at the calling party, to locate the calling party, as is known per se. The features of the embodiment of FIG. 6 can be used in the other embodiments, since, as is known per se, the data transmitted through the internet is increasingly often the same as the data in a telephony network.

Figure 7:
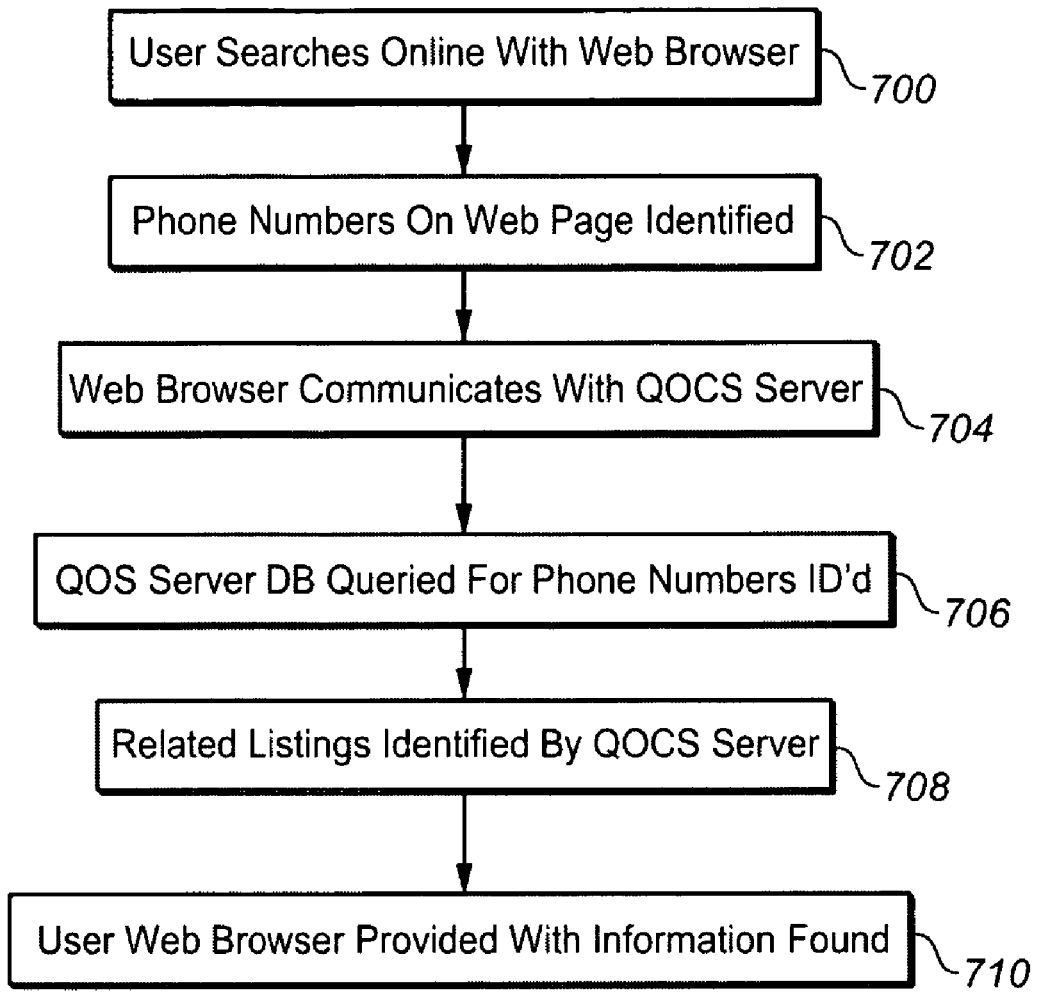
FIG. 7 is a flowchart for a method of practicing the present invention using a web browser.

Turning attention to FIG. 7, there is shown a flowchart for a method of practicing the present invention using a web browser, which may be a computer web browser or mobile phone web browser, and in general this embodiment operates the same the embodiment of the invention designed for telephony, except that it is using the internet as a communications network. In step 700, labeled "User Searches Online with Web Browser", a user (the calling party) of the present invention who wishes to obtain information about a merchant (the called party) can search the internet online with a web browser that may have a plug-in application to incorporate the present invention, or otherwise any other software application. The plug-in may search for a particular category or type of merchant (e.g., LA plumbers), or, on any particular web page, the plug-in may identify phone numbers within web pages, or other electronic presentations of information. As phone numbers take the form of area codes (also known as NPA), prefixes (also known as NXX) and four digits (NPA-NXX-XXXX), a series of 10 digits, or 11 digits when preceded by a 1, can easily be found and a number such as 1-NPA-NXX-XXXX) is easily identifiable. Further, area codes and prefixes are known and assigned geographically; for example 323-822 is the West Hollywood area of Los Angeles Calif. The invention searches for phone numbers and attempts to locate the found phone number in a database, such as database 245 of the present invention. If a match is made to a business listing in the database, the application identifies the category of business that has been assigned the phone number (e.g., a plumber) and the application also identifies the geography and address of the business (e.g., West Hollywood, Calif.), since oftentimes a calling party wants to speak to a local merchant. The application then uses the geography and category of the business to retrieve other business listings from the database. These listings may be recommended businesses, based on areas of the claimed invention. Callers to the first business phone number may then be offered the option to place subsequent telephone calls to other businesses in the geography and category in order to speak with other competitive businesses in order to receive a second opinion or second, or subsequent, quotes.

Thus in step 702, labeled "Phone Numbers On Web Page Identified", the application of FIG. 7 identifies phone numbers on a web page as specified herein. Next, in step 704 labeled "Web Browser Communicates With QOCS Server", the web browser plug-in will communicate with a server that incorporates the present invention, e.g. such as taught in FIGS. 1 and 2A herein, and in step 706, labeled "QOCS Server Db Queried For Phone Numbers ID'd", the application attempt to ascertain the QOCS associated with a particular telephone number found on the webpage (and ultimately a particular merchant associated with the number) by querying a database such as database 245 in FIG. 2A. In step 708, labeled "Related Listings Identified By QOCS Server", the application identifies any related listings; for example, if the phone number identified on the webpage was for a plumber in Los Angeles, then other plumbers that score a high QOCS score and/or are in the same geographical region as identified by the phone number are identified. In Step 710, labeled "User Web Browser Provided With Information Found", the user of the web browser incorporating the present invention is provided with a list of merchants that can be called.

Modifications, subtractions and/or additions can be applied by one of ordinary skill from the teachings herein without departing from the scope of the present invention. For example, feedback from the system can inform a caller on hold as to the status of a directory assistance search being made by the system. Further, though numerous features of the present invention are disclosed, a subset of these features may be employed in a stripped-down version of the present invention, as can be appreciated by a skilled artisan from the teachings herein, e.g. a system that does not try and screen dirty calls, as per the embodiment of the invention disclosed in connection with FIG. 3. The scope of the invention is thus limited solely by the claims.

It is intended that the scope of the present invention extends to all such modifications and/or additions and that the scope of the present invention is limited solely by the claims set forth below.

I claim:

1. A system for directory assistance searches, comprising:
a database storing data;
a software system operatively connected to the database for matching data from an incoming communications device call to the data stored by the database;
a software portion from the software system for tracking a relevancy score relating to Quality of Customer Service or Satisfaction (QOCS), the relevancy score determined by parameters comprising the data from the database; and,
the incoming call is routed according to the relevancy score;
a plurality of incoming calls are routed by the software system to a plurality of called parties and the relevancy score relating to QOCS is tracked for each of the plurality of called parties; and,
the relevancy score is a weighted sum of the parameters, and the parameters are historic data derived from previous incoming calls to the called parties; and, a communications device for transmitting the data of the communications device call, the communications device selected from the group consisting of a plain old telephone service (POTS), landline telephone handset, handheld wireless mobile phone, cell phone, personal digital assistant (PDA) connected to make telephone calls, Skype-based device, and web-based internet browser connected to make telephone calls;

the software portion rates the plurality of called parties according to the relevancy scores, with the rating enabling ranking of the called parties; and, the relevancy score parameters are selected from the group consisting of average call length, an average historic relevancy score (AHRS) including the average call length, a differential historic relevancy score (DHRS) including the average call length, number of calls, an AHRS including the number of calls and a DHRS including the number of calls, and;

wherein the data from the communications device call is matched with data residing in a database, and the incoming call may be routed by the software system.

2. The invention according to claim 1, wherein:

the relevancy score parameters further comprises negative consumer feedback, and, the relevancy score parameters are selected from the group consisting of disconnected numbers, busy signals, and not answered calls, an AHRS including the disconnected numbers, a DHRS including the disconnected numbers, an AHRS including the busy signals, a DHRS including the busy signals, an AHRS including the not answered calls, and a DHRS including the not answered calls and, the software portion allowing a calling party to input data into the database to determine QOCS relevancy score, said calling party prompted by the software portion to rate one or more called parties at the conclusion of a call from the calling party to the called parties.

3. The invention according to claim 1, wherein:

the software portion allowing a calling party to input data into the software system to select a plurality of called parties, and interact with a plurality of called parties on the same incoming call; and, the relevancy score parameters further comprises negative consumer feedback, and, the relevancy score parameters are selected from the group consisting of disconnected numbers, busy signals, and not answered calls, an AHRS including the disconnected numbers, a DHRS including the disconnected numbers, an AHRS including the busy signals, a DHRS including the busy signals, an AHRS including the not answered calls, and a DHRS including the not answered calls.

4. The invention according to claim 1, wherein:

the relevancy score parameters are selected from the group consisting of disconnected numbers, busy signals, and not answered calls, an AHRS including the disconnected numbers, a DHRS including the disconnected numbers, an AHRS including the busy signals, a DHRS including the busy signals, an AHRS including the not answered calls, and a DHRS including the not answered calls.

5. The invention according to claim 4, wherein:

the software portion identifies a calling party and initiates contact with the calling party, to allow the calling party to input data into the database regarding the called party to determine QOCS relevancy scores; and, the relevancy score parameters further comprises negative consumer feedback.

6. The invention according to claim 1:

the software portion allowing a calling party to input data into the database to determine QOCS relevancy scores;

a voice recognition software portion in the software system, the voice recognition software recognizing voice-based data from the calling party;

wherein the software system accessing the database according to an expert system selected from the group consisting of a rules-based expert system, a knowledge-based expert system, or a hybrid-based expert system; and, the relevancy score parameters further comprises negative consumer feedback, and, the relevancy score parameters are selected from the group consisting of disconnected numbers, busy signals, and not answered calls, answering machine reached, voicemail reached, Interactive Voice Response (IVR) reached, AHRS and DHRS of these group of parameters;

wherein the database is queried by the software system to match data according to a Structured Query Language (SQL) query.

7. A method for directory assistance searches comprising the steps of:

receiving an incoming call placed from a telephony communications device to a software-based system for routing calls;

storing data in a database, the database operatively connected to the software-based system, the database data relating to historic data derived from previous calls to the software-based system;

matching data from the database to data from the incoming call;

routing the incoming call to a called party according to parameters comprising the data in the database; and, calculating a relevancy score from the parameters, the relevancy score relating to Quality of Customer Service or Satisfaction (QOCS), the relevancy score is a weighted sum of the parameters, and the parameters are historic data derived from previous incoming calls to the called parties; and routing the incoming call according to the QOCS relevancy score; and, routing a plurality of incoming calls to a plurality of called parties;

tracking the relevancy score relating to QOCS for each of a plurality of the called parties; and determining the relevancy score parameters, such parameters are selected from the group consisting of average call length, an average historic relevancy score (AHRS) including the average call length, a differential historic relevancy score (DHRS) including the average call length, number of calls, an AHRS including the number of calls and a DHRS including the number of calls; and, wherein the data from the incoming call is matched with the data from the database, and the incoming call is routed by the software-based system.

8. The method according to claim 7, further comprising the steps of:

determining the relevancy score parameters and further including in the relevancy score the parameter of negative consumer feedback, and further including as the relevancy score parameters such parameters selected from the group consisting of disconnected numbers, busy signals, and not answered calls and the AHRS and DHRS of these parameters.

9. The method according to claim 8, further comprising the steps of:
- dialing a plurality of called parties using the software-based system, based on the QOCS relevancy score of the called parties, in parallel during the same incoming call;
- allowing a calling party to input data to select from the plurality of called parties during the same incoming call, the data by the calling party comprising a list of demands identified by the calling party; and,
- ranking a plurality of called parties during the same incoming call by a calling party;

wherein a calling party may select from a plurality of called parties during the same call.

10. The method according to claim 8, further comprising the steps of:
- ranking the called parties according to the QOCS relevancy score, the called parties comprising vendors;
- querying the database for ranked vendors; and,
- initiating calls to the ranked vendors for purposes of solicitation of the ranked vendors.

* * * * *